US012806614B2

(12) United States Patent
Ichikawa

(10) Patent No.: US 12,806,614 B2
(45) Date of Patent: Nov. 24, 2026

(54) APPARATUS AND METHOD

(71) Applicant: Canon Kabushiki Kaisha, Tokyo (JP)

(72) Inventor: Keita Ichikawa, Nasushiobara (JP)

(73) Assignee: Canon Kabushiki Kaisha, Tokyo (JP)

( * ) Notice: Subject to any disclaimer, the term of this patent is extended or adjusted under 35 U.S.C. 154(b) by 441 days.

(21) Appl. No.: 18/533,816

(22) Filed: Dec. 8, 2023

(65) Prior Publication Data

US 2024/0189810 A1 Jun. 13, 2024

(30) Foreign Application Priority Data

Dec. 8, 2022 (JP) ................................ 2022-196248

(51) Int. Cl.
*B01L 3/00* (2006.01)

(52) U.S. Cl.
CPC ....... *B01L 3/502* (2013.01); *B01L 2400/0433* (2013.01); *B01L 2400/086* (2013.01)

(58) Field of Classification Search
CPC ....... B01L 2400/0433; B01L 2400/086; B01L 3/502
See application file for complete search history.

(56) References Cited

U.S. PATENT DOCUMENTS

2009/0104056 A1 4/2009 Miyazawa
2009/0313809 A1* 12/2009 Kato ...................... H04R 31/00 29/594
2014/0144518 A1* 5/2014 Bohringer ................. F15D 1/00 137/13

FOREIGN PATENT DOCUMENTS

JP 2009-103023 A 5/2009

* cited by examiner

*Primary Examiner* — Jennifer Wecker
(74) *Attorney, Agent, or Firm* — Oblon, McClelland, Maier & Neustadt, L.L.P.

(57) ABSTRACT

An apparatus according to an embodiment includes a member having a flow path in the member; a projection that is provided on a first surface of an inner wall of the flow path, and that has an inclined surface disposed so that the distance from a second surface positioned on a side opposite to the first surface in the inner wall decreases toward a downstream side in a flowing direction of target liquid; and a transducer element configured to cause the projection to vibrate in an intersecting direction that intersects the flowing direction.

20 Claims, 7 Drawing Sheets

APPARATUS AND METHOD

CROSS-REFERENCE TO RELATED APPLICATIONS

This application is based upon and claims the benefit of priority from Japanese Patent Application No. 2022-196248, filed on Dec. 8, 2022; the entire contents of which are incorporated herein by reference.

FIELD

Embodiments described herein relate generally to an apparatus and a method.

BACKGROUND

In recent years, methods have been developed to allow target liquid to flow through a flow path to perform a sample test, cell culture, chemical analysis, and the like. With these methods, it is possible to reduce the amount of target liquid to be used with a decrease in the sectional area of the flow path. Therefore, to use valuable target liquid, the minimum required sectional area of the flow path is sought after.

DETAILED DESCRIPTION

Hereinafter, embodiments of an apparatus and a method will be described in detail with reference to the accompanying drawings.

Figure 1:
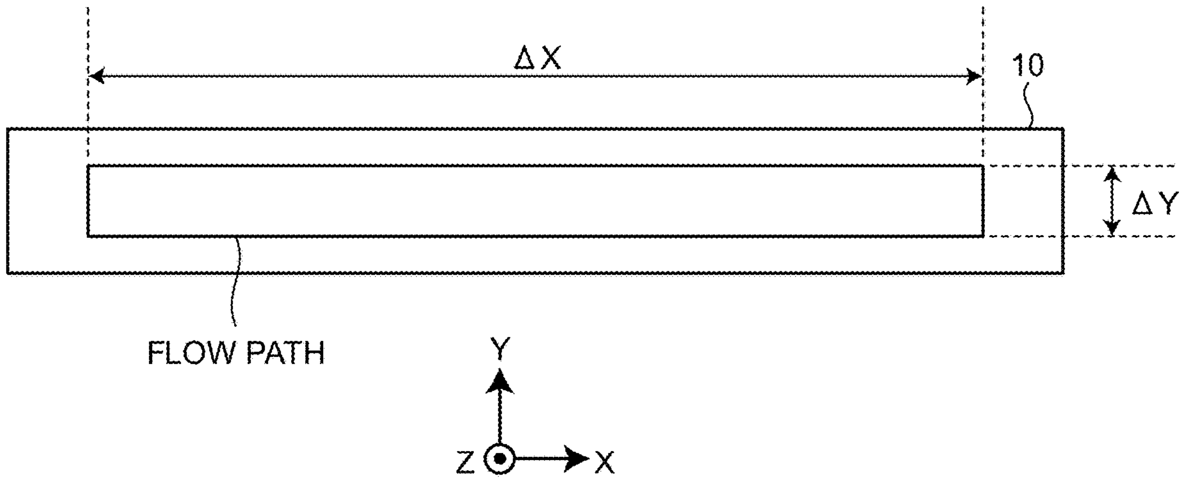
FIG. 1 is a diagram illustrating an example of a flow path according to an embodiment.

FIG. 1 illustrates an example of a flow path. The flow path in FIG. 1 is a gap provided in a member 10, and a sample test, cell culture, chemical analysis, and the like are performed by allowing target liquid to flow through the flow path. The type of target liquid is not specifically limited, and may be a sample, reagent, or other chemicals.

In FIG. 1, the X direction, the Y direction, and the Z direction are orthogonal to one another. In the following, a flowing direction of the target liquid in the flow path is referred to as the X direction, and the downstream side in the flowing direction is referred to as the +X direction. The area of a flow path on the YZ plane corresponds to the sectional area of the flow path. The Y direction or the Z direction may be arranged to correspond to the vertical direction. However, this is not particularly limited.

To reduce the usage amount of target liquid, it is preferable to reduce the sectional area of the flow path. The specific dimensions of the flow path vary depending on the usage. For example, the width "ΔY" of the flow path in the Y direction illustrated in FIG. 1 is designed to be "300 μm" or less. In contrast, the length "ΔX" of the flow path is long, and may be designed to be about "several centimeters". In such a fine flow path, the influence of surface tension is significant, and it is difficult to allow the target liquid to flow through the flow path only by the gravity or the driving force due to the wettability of the inner wall of the flow path.

As a method of allowing the target liquid to flow through a fine flow path, pressure may be applied to the target liquid by a pump. For example, in FIG. 2, a connector 21*a* and a tube 22*a* are connected to an end part of the flow path on the upstream side, and a connector 21*b* and a tube 22*b* are connected to an end part on the downstream side. Moreover, a micropump 23 applies pressure to the inside of the connector 21*a* and the tube 22*a*, and reduces the pressure inside the connector 21*b* and the tube 22*b*. For example, the micropump 23 is a peristaltic pump, a piezo pump, a diaphragm, or the like. Consequently, it is possible to apply pressure exceeding the surface tension to the target liquid in the flow path, and force the target liquid to flow toward the downstream side.

Figure 2:
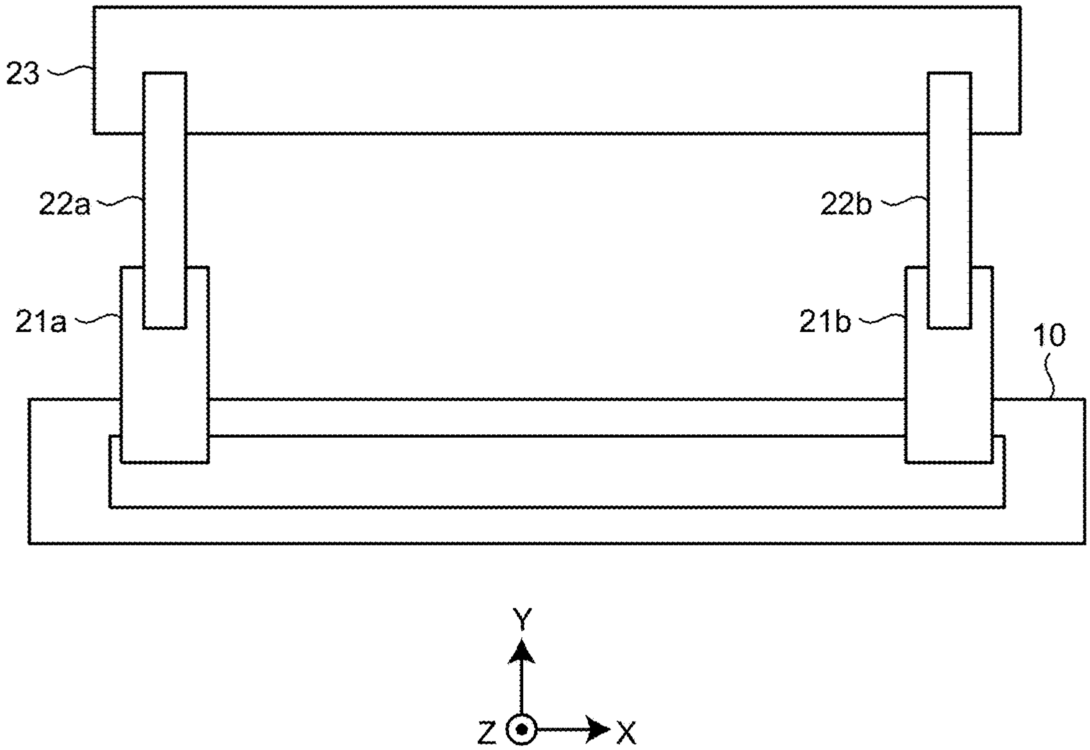
FIG. 2 is a diagram illustrating an example of a method of allowing target liquid to flow through the flow path according to the embodiment.

However, with a method illustrated in FIG. 2, the inside of the connector 21*a* and the tube 22*a* needs to be filled with the target liquid. Hence, the usage amount of the target liquid will be increased. Therefore, with the configuration illustrated in FIG. 3, an apparatus 100 of the embodiment allows target liquid to flow more efficiently through a flow path. The apparatus 100 is an analysis apparatus used to carry out a sample test and chemical analysis, a manufacturing apparatus used to carry out cell culture, or a processing apparatus used to select fine particles and to mix multiple chemicals.

Figure 3:
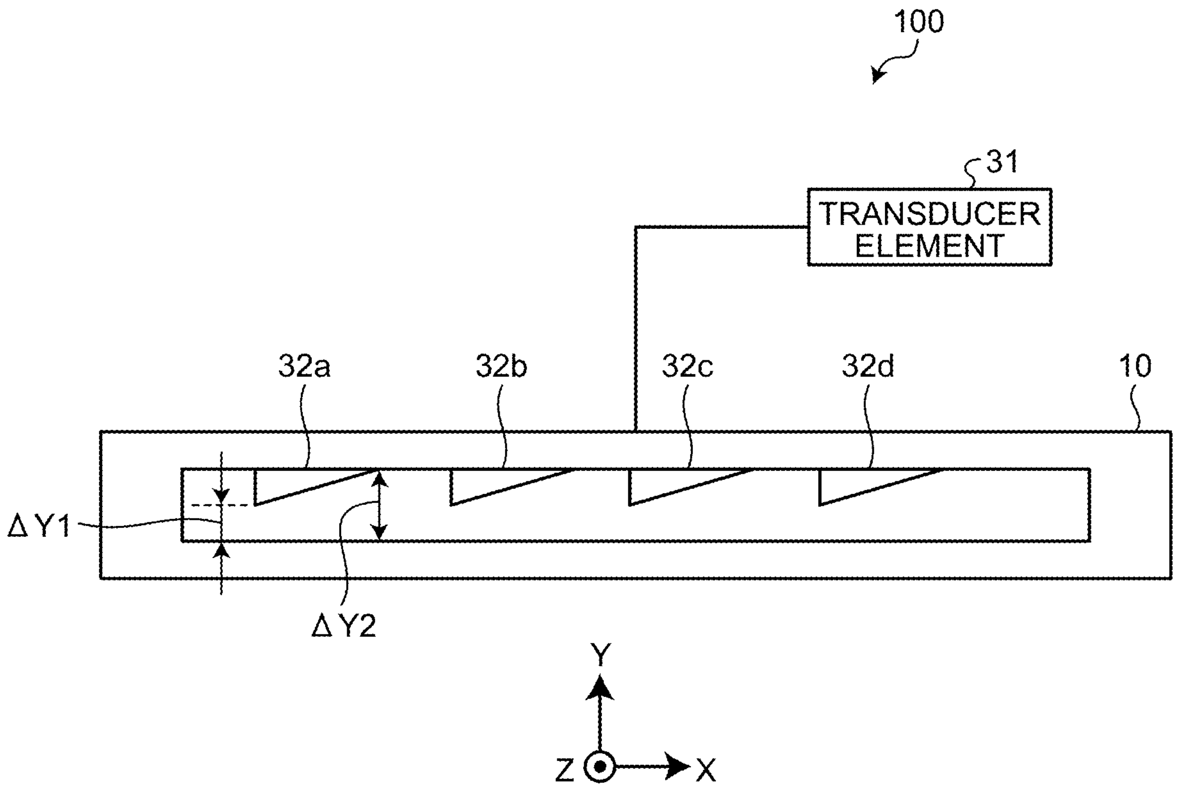
FIG. 3 is a diagram illustrating an example of a configuration of an apparatus according to the embodiment.

The apparatus 100 illustrated in FIG. 3 includes a transducer element 31, a projection 32*a*, a projection 32*b*, a projection 32*c*, and a projection 32*d*, in addition to the member 10 having a flow path therein. As illustrated in FIG. 3, the projections 32*a* to 32*d* are provided on the inner wall of the flow path. In the inner wall of the flow path, a surface on which a projection such as the projections 32*a* to 32*d* is provided, may also be referred to as a first surface. Moreover, in the inner wall of the flow path, a surface positioned on a side opposite to the first surface may also be referred to as a second surface. In FIG. 3, the surface on the upper side (+Y direction) in the inner wall of the flow path corresponds to the first surface, and the surface on the lower side (−Y direction) corresponds to the second surface. The projections 32*a* to 32*d* each have an inclined surface disposed so that the distance from the second surface decreases toward the downstream side (+X direction) in the flowing direction of the target liquid.

For example, the section of the projection 32*a* on the XY plane has a right triangular shape in which the right vertex comes into contact with the inner wall of the flow path, and another vertex comes into contact with the inner wall of the flow path at a position on the +X direction side relative to the position of the right vertex. At this point, the hypotenuse of the right triangle is disposed so that the distance from the second surface decreases toward the +X direction. That is, the projection 32*a* has a shape in which the sectional shape thereof on a plane (XY plane) that is orthogonal to the first surface of the inner wall of the flow path and that is parallel to the flowing direction is a right triangle. Also, the hypotenuse of the right triangle corresponds to an inclined surface disposed so that the distance from the second surface decreases toward the +X direction side. At this point, the width of the flow path in the Y direction increases from "ΔY1" to "ΔY2" toward the +X direction. The sectional area of the flow path is increased by the difference of "ΔY2−ΔY1".

Figure 4A:
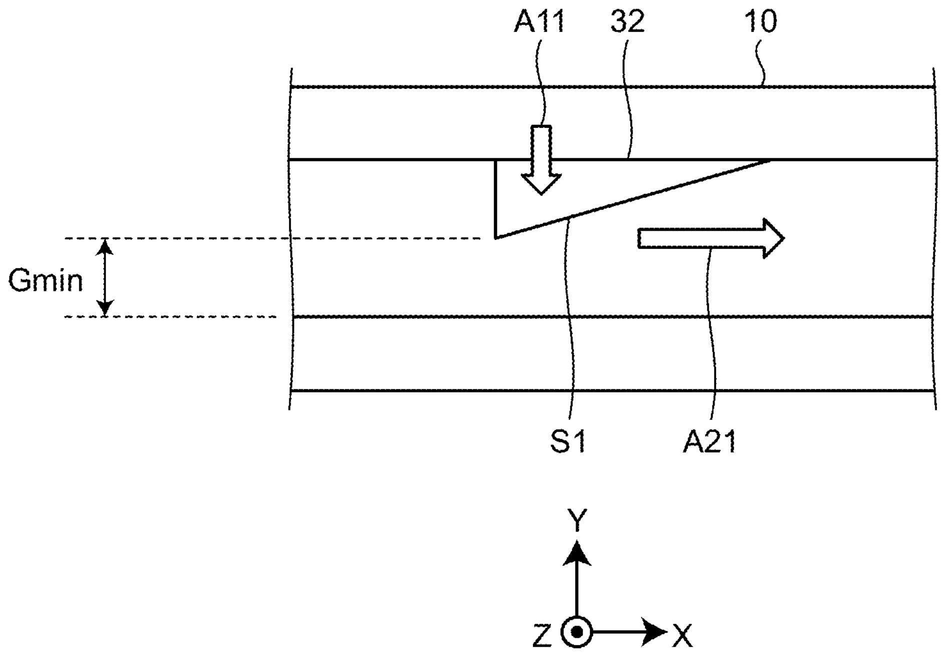
FIG. 4A is a diagram for explaining driving force applied to the target liquid in the flow path according to the embodiment.
Figure 4B:
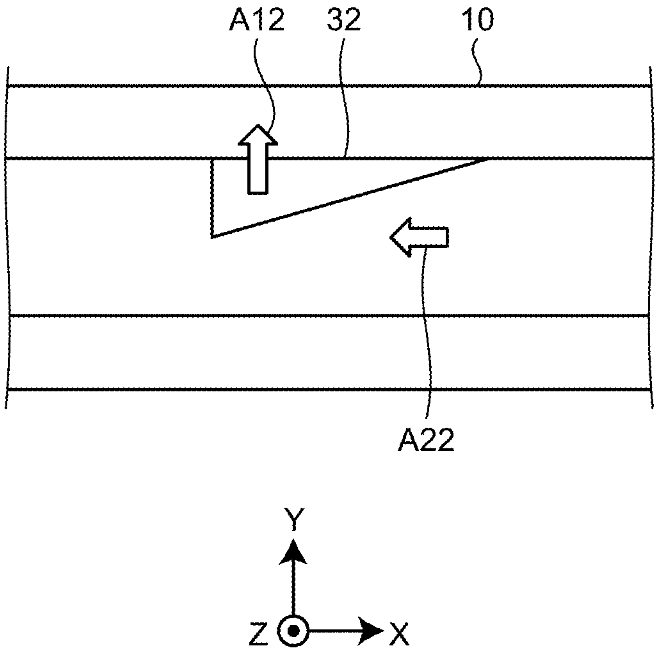
FIG. 4B is a diagram for explaining driving force applied to the target liquid in the flow path according to the embodiment.

In the following, various projections such as the projections 32*a* to 32*d* will simply be referred to as the projections 32, if the projections need not be particularly distinguished from each other. The transducer element 31 causes each of the projections 32 to vibrate in the Y direction, as illustrated by an arrow A11 and an arrow A12 in FIG. 4A and FIG. 4B. In FIG. 4A and FIG. 4B, the projection 32 vibrates in the Y direction. However, the vibration direction need not be orthogonal to the X direction in a strict manner, and may be a direction intersecting the X direction. The direction intersecting the X direction is also referred to as an intersecting direction. The Y direction is an example of an intersecting direction. For example, the transducer element 31 is an exciter that causes the projection 32 to vibrate in the Y direction by coming into contact with the outer wall of the member 10 on the +Y direction side. For example, the transducer element 31 is an ultrasonic exciter.

For example, the transducer element 31 includes a processing circuit, and detects the fact that the target liquid starts to flow through the flow path from the end in the −X direction, according to an input from a sensor or user, and starts the projection 32 to vibrate after the detection. Such a processing circuit is implemented by a processor.

While the projection 32 is vibrating in the Y direction, a phase in which the projection 32 moves in the −Y direction (FIG. 4A) and a phase in which the projection 32 moves in the +Y direction (FIG. 4B) are repeated. When the projection 32 moves in the −Y direction, as illustrated by an arrow A21 in FIG. 4A, the target liquid flows in the +X direction. More specifically, when the projection 32 moves in the −Y direction, the target liquid is pushed in the +X direction by an inclined surface S1 of the projection 32. On the other hand, when the projection 32 moves in the +Y direction, as illustrated by an arrow A22 in FIG. 4B, the target liquid flows in the −X direction.

In this example, compared to the flow of the target liquid illustrated by the arrow A21, the flow of the target liquid illustrated by the arrow A22 is small. That is, by alternately generating the flow of the target liquid illustrated by the arrow A21 and the flow of the target liquid illustrated by the arrow A22, and with the flow rate difference therebetween, it is possible to allows the target liquid to flow in the +X direction.

As described above, the apparatus 100 of the embodiment includes the member 10 having a flow path therein, the projection 32 provided on the first surface of the inner wall of the flow path and that has the inclined surface disposed so that the distance from the second surface decreases toward the downstream side in the flowing direction of the target liquid, and the transducer element 31 that causes the projection 32 to vibrate in the intersecting direction that intersects the flowing direction. With such a configuration, the apparatus 100 can allow the target liquid to flow efficiently through the flow path. That is, with the apparatus 100, it is possible to allow the target liquid to flow even through a fine flow path, and to perform a sample test, cell culture, chemical analysis, and the like with a small amount of target liquid. Moreover, with the apparatus 100, for example, the inside of the connector 21*a* and the tube 22*a* illustrated in FIG. 2 need not be filled with the target liquid. Hence, it is possible to further reduce the usage amount of the target liquid.

As an example, the apparatus 100 is a test cartridge used for a sample test to determine whether a subject is suffering from a viral disease. For example, at first, body fluids such as the nasal cavity and pharynx of a subject, blood, etc. are collected as a specimen (sample). The liquid specimen or a liquid obtained by mixing the specimen and a detection reagent are examples of the target liquid.

The target liquid is dropped into the introduction hole of the apparatus 100, receives vibration from the transducer element 31, flows through the flow path in the apparatus 100, and reaches the reaction area. For example, in the case of an antigen test, an antibody that specifically binds to the antigen is immobilized on the reaction area. If the subject is suffering from the viral disease to be tested, the antigen contained in the specimen binds to the antibody and microparticles contained in the detection reagent, and further binds to the antibody immobilized on the reaction area.

Next, the apparatus 100 is attached as a cartridge to a main apparatus, and light is emitted into the reaction area from the main apparatus. As described above, if the subject is suffering from the viral disease to be tested, the microparticles contained in the detection reagent bind to the reaction area via the antigen. By measuring the degree of attenuation of the light emitted from the main apparatus, it is possible to determine whether the microparticles are bound to the reaction area and to determine the presence or absence of the antigen.

In the configuration illustrated in FIG. 2, pressure may be applied to the target liquid in the flow path, after filling the inside of the connector 21*a* and the tube 22*a* with gas or another liquid different from the target liquid. However, in this case, gas or the other liquid may dissolve in the target liquid, and may cause the target liquid to react or deteriorate. Moreover, if there are a plurality of the flow paths, each flow path needs to be filled with gas or another liquid. In contrast, with the apparatus 100, it is possible to allow the target liquid to flow through the flow path without causing the target liquid to deteriorate. Moreover, it is also possible to allow the target liquid to continuously flow through the flow paths.

The configuration of the apparatus 100 illustrated in FIG. 3 is merely an example, and various modifications are possible.

For example, in FIG. 3, four projections (projection 32*a*, projection 32*b*, projection 32*c*, and projection 32*d*) are illustrated as examples of the projection 32. However, the number of projections in the apparatus 100 can be changed optionally, and the number of projections may be one.

Moreover, in FIG. 3, the projection 32 has a right triangular shape. However, the shape of the projection 32 is not limited thereto. Hereinafter, a modification of the shape of the projection 32 will be described with reference to FIG. 5A and FIG. 5B.

Figure 5A:
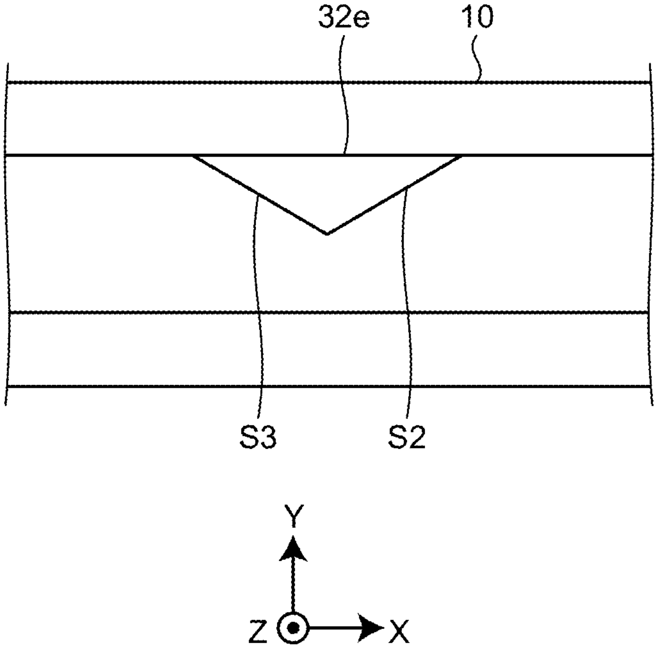
FIG. 5A is a diagram illustrating an example of a shape of a projection according to the embodiment.

In FIG. 5A, a projection 32*e* is illustrated as an example of the projection 32. The sectional shape of the projection 32*e* on the XY plane is a triangle one side of which comes into contact with the inner wall of the flow path. Of the sides other than the side that comes into contact with the inner wall of the flow path, among the three sides of the triangle, a surface corresponding to the side on the +X direction side is referred to as an inclined surface S2, and a surface corresponding to the side on the −X direction side is referred to as an inclined surface S3. In this example, to allow the target liquid to flow in the +X direction by receiving vibrations from the transducer element 31, the inclined surface S2 should be larger than the inclined surface S3.

If the sizes of the inclined surface S2 and the inclined surface S3 are the same, the force that drives the target liquid in the +X direction and the force that drives the target liquid in the −X direction are balanced. Hence, if the gravity or the driving force due to the wettability of the inner wall of the flow path is insufficient, the flow in the +X direction will not be generated. Moreover, if the inclined surface S3 is larger than the inclined surface S2, the force that inhibits the flow in the +X direction will be applied on the target liquid. Hence, the flow in the +X direction will not be generated.

That is, the projection 32*e* is a kind of polyhedron, and has the inclined surface S2 disposed so that the distance from the second surface decreases toward the +X direction, and the inclined surface S3 disposed so that the distance from the second surface increases toward the +X direction. In this example, if the inclined surface S2 is larger than the inclined surface S3, it is possible to allow the target liquid to flow in the +X direction by receiving vibrations from the transducer element 31. The inclined surface S2 is an example of a first inclined surface. The inclined surface S3 is an example of a second inclined surface.

Figure 5B:
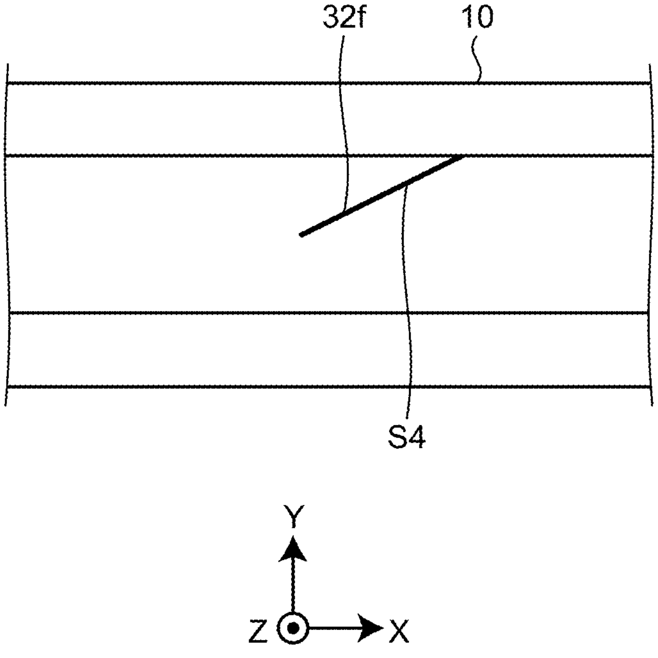
FIG. 5B is a diagram illustrating an example of a shape of a projection according to the embodiment.

In FIG. 5B, a projection 32*f* is illustrated as an example of the projection 32. The projection 32*f* has an inclined surface S4 disposed so that the distance from the second surface of the inner wall of the flow path decreases toward the +X direction. In other words, the projection 32*f* is a part obtained by extracting only a portion corresponding to the inclined surface S1, from the projection 32 illustrated in FIG. 4A and FIG. 4B. As described above, the driving force that allows the target liquid to flow in the +X direction is generated when the inclined surface S1 pushes the target liquid in the +X direction. Therefore, similarly, the projection 32*f* obtained by extracting only a portion corresponding to the inclined surface S1 can also generate the driving force to allow the target liquid to flow in the +X direction.

In addition to the examples described above, the projection 32 may be formed in any shape, as long as the flow rate difference as illustrated in FIG. 4A and FIG. 4B can be obtained when the projection 32 is vibrated. For example, the sectional shape of the projection 32 on the XY plane may be a trapezoid or other polyhedrons. Moreover, in FIG. 5A and FIG. 5B, the inclined surface S2, the inclined surface S3, and the inclined surface S4 are illustrated in straight lines. However, the inclined surfaces may also be curved. That is, the projection 32 may have a curved surface.

The width of various types of projections 32 described above in the Z direction may be the same as the width of the flow path in the Z direction, or may be smaller than the width of the flow path in the Z direction. If the widths of the projection 32 and the flow path in the Z direction are the same, it is preferable to design a minimum gap (Gmin illustrated in FIG. 4A) from the projection 32 to the inner wall of the flow path not to be too small. This is because, if the widths of the projection 32 and the flow path in the Z direction are the same, and if the minimum gap Gmin is small, the projection 32 will block the flow path and blocks the flow of the target liquid. On the other hand, the force to drive the target liquid in the flow path is increased with a decrease in the minimum gap Gmin. The minimum gap Gmin is adjusted so that the flow path is not blocked while providing a sufficient driving force.

Figure 6A:
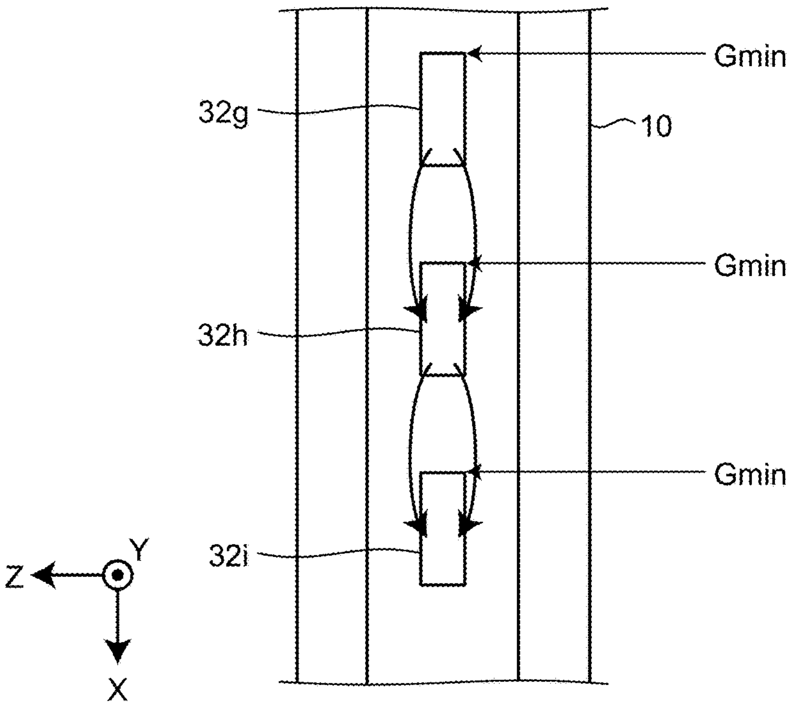
FIG. 6A is a diagram illustrating an example of an arrangement of projections according to the embodiment.
Figure 6B:
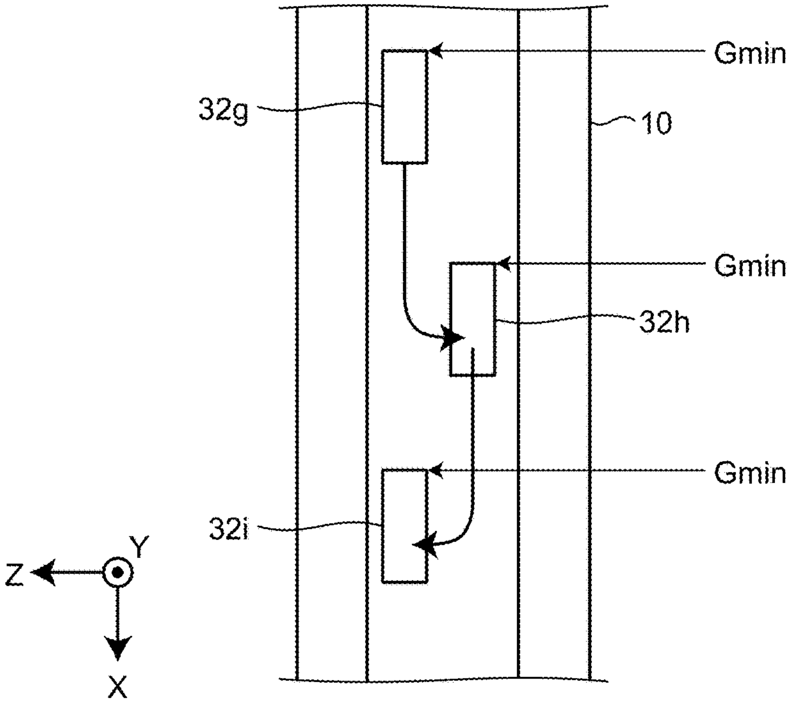
FIG. 6B is a diagram illustrating an example of an arrangement of projections according to the embodiment.

A case where the width of the projection 32 in the Z direction is smaller than the width of the flow path in the Z direction will be described with reference to FIG. 6A and FIG. 6B. In FIG. 6A and FIG. 6B, as examples of the projection 32, a projection 32*g*, a projection 32*h*, and a projection 32*i* having a width in the Z direction smaller than the width of the flow path in the Z direction are illustrated. The sectional shapes of the projections 32*g* to 32*i* on the XY plane are not particularly limited. However, for example, the shape illustrated in FIG. 3 to FIG. 4B may be used. In this case, as illustrated in FIG. 6A and FIG. 6B, the minimum gap Gmin from each of the projections 32*g* to 32*i* to the inner wall of the flow path is generated at a position of the end part of each of the projections 32*g* to 32*i* on the −X direction side.

In FIG. 6A, the projections 32*g* to 32*i* are disposed in a straight line along the flowing direction. In FIG. 6B, the projections 32*g* to 32*i* are disposed at different positions in the direction parallel to the first surface and orthogonal to the flowing direction (that is, in the Z direction). The projections 32*g* to 32*i* in FIG. 6B may also be alternately arranged at positions on both ends in the flow path. In this example, even if the minimum gap Gmin is small and the target liquid cannot pass through the gap between the projections 32*g* to 32*i* and the inner wall of the flow path, as illustrated by the arrows in FIG. 6A and FIG. 6B, the target liquid can flow while circumventing the positions of the minimum gaps Gmin.

As described above, the force to drive the target liquid in the flow path is increased with a decrease in the minimum gap Gmin. However, if the flow path is fine, there may be a case where the minimum gap Gmin is changed and becomes substantially "0" by the dimensional tolerance in manufacturing, wear due to use, deformation, and the like. Even in such a case, with the arrangement of the projections 32*g* to 32*i* illustrated in FIG. 6A and FIG. 6B, it is possible to ensure the path through which the target liquid can flow.

Next, variations of the method in which the transducer element 31 causes the projection 32 to vibrate will be described with reference to FIG. 7A to FIG. 7C.

Figure 7A:
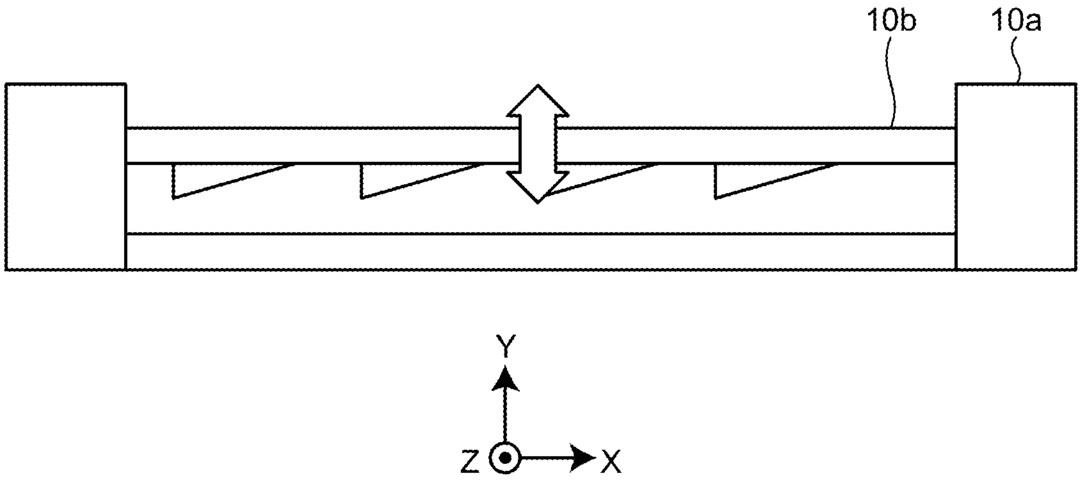
FIG. 7A is a diagram illustrating an example of a method for causing the projections to vibrate according to the embodiment.

In FIG. 7A, the member 10 having a flow path therein is formed of a member 10*a* and a member 10*b* that can move in the Y direction relative to the member 10*a*. The projections 32 are disposed on the member 10*b*. In this case, the transducer element 31 can cause the projections 32 to vibrate in the Y direction, by moving the position of the member 10*b* relative to the member 10*a* in the Y direction. With a method illustrated in FIG. 7A, compared to a case where the member 10 is formed of a single member, it is possible to cause the projections 32 to vibrate greatly in the Y direction and obtain a greater driving force. The member 10*a* is an example of a first member. The member 10*b* is an example of a second member.

Figure 7B:
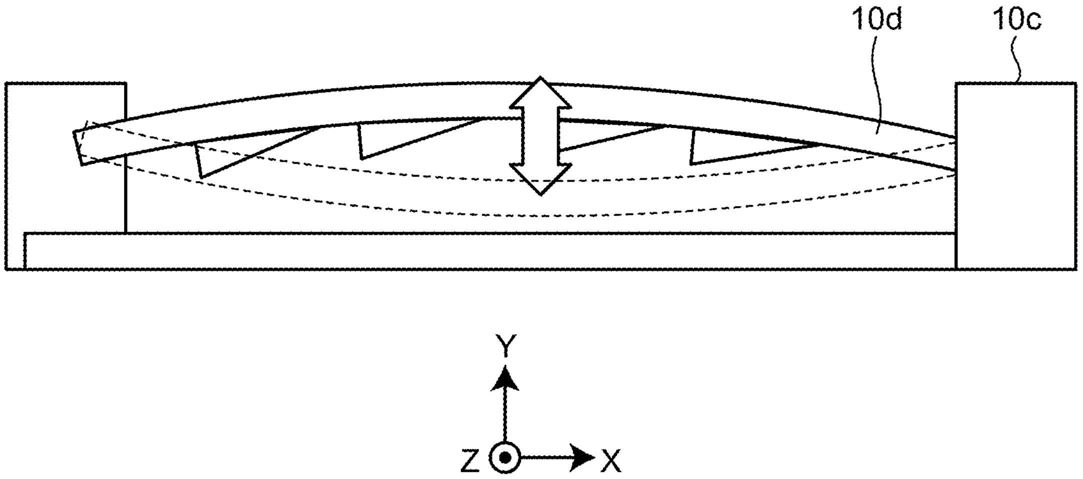
FIG. 7B is a diagram illustrating an example of a method for causing the projections to vibrate according to the embodiment.

In FIG. 7B, the member 10 having a flow path therein is formed of a member 10*c* and a deformable member 10*d*. The projections 32 are disposed on the member 10*d*. In this case, the transducer element 31 can cause the projections 32 to vibrate in the Y direction by using a connection part between the member 10*c* and the member 10*d* as a fixed end, and using the member 10*d* as a bowstring. With a method illustrated in FIG. 7B, compared to a case where the member 10 is formed of a single member, it is possible to cause the projections 32 to vibrate greatly in the Y direction and obtain a greater driving force. The member 10$c$ is an example of the first member. The member 10$d$ is an example of the second member.

Figure 7C:
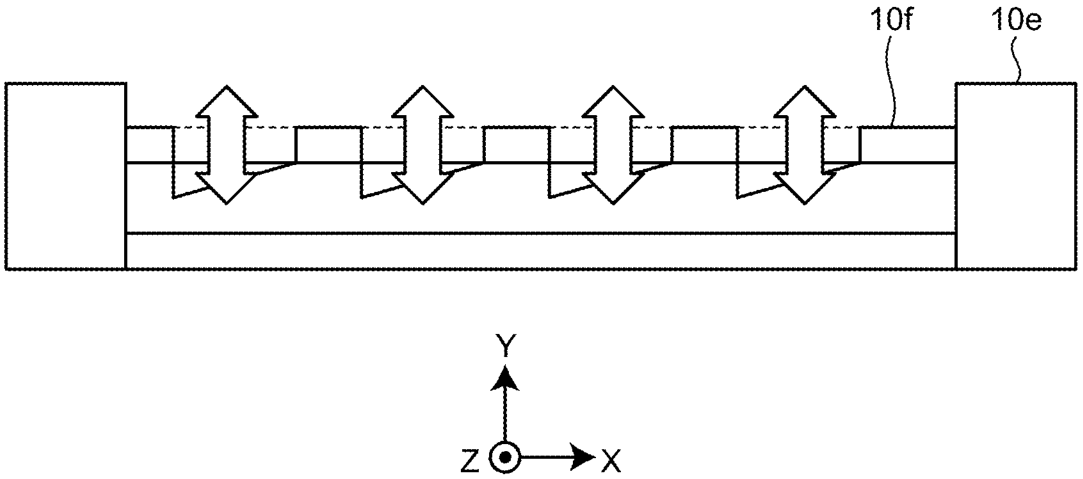
FIG. 7C is a diagram illustrating an example of a method for causing the projections to vibrate according to the embodiment.

In FIG. 7C, the member 10 having a flow path therein is formed of a member 10$e$ and a member 10$f$ with a plurality of holes. The projections 32 are disposed in the respective holes of the member 10$f$ in a movable manner in the Y direction. In this case, the transducer element 31 can cause each projection 32 to vibrate in the Y direction, by moving the position of the projection 32 in the hole in the Y direction. With a method illustrated in FIG. 7C, compared to a case where the member 10 is formed of a single member, it is possible to cause the projections 32 to vibrate greatly in the Y direction and obtain a greater driving force. Moreover, because only the projection 32 is moved, it is possible to cause the projection 32 to vibrate with the minimum kinetic energy.

In the embodiment described above, when there are a plurality of the projections 32, the projections 32 are disposed on one of the surfaces of the inner wall of the flow path. However, the embodiment is not limited thereto. For example, in FIG. 3, the projections 32$a$ to 32$d$ may be disposed on the surface on the +Y direction side in the inner wall of the flow path, and the similar projections 32 may also be disposed on the surface on the −Y direction side in the inner wall of the flow path.

In the embodiment described above, the target liquid has been described as a liquid used for sample test, cell culture, chemical analysis, and the like. However, the embodiment is not limited thereto. For example, the target liquid may be a bonding material such as an adhesive or solder.

For example, the member 10 includes a first member including a first surface provided with the projection 32 and a second member including a second surface. A gap is created between such members depending on the smoothness of the member surface. When bonding the first member and the second member, the target liquid, which is the bonding material, can flow the gap between the first surface and the second surface as a flow path by the transducer element 31 vibrating the projection 32. Similar to the various embodiments described above, the apparatus 100 can cause the target liquid to flow even through fine flow path. That is, even if the gap between the first surface and the second surface is fine, the gap can be filled with the bonding material and the first member and the second member can be sufficiently bonded. Furthermore, the amount of bonding material used can also be reduced.

The term "processor" used in the above description refers to, for example, a circuit such as a CPU, a graphics processing unit (GPU), an application specific integrated circuit (ASIC), or a programmable logic device (for example, a simple programmable logic device (SPLD), a complex programmable logic device (CPLD), and a field programmable gate array (FPGA)). For example, if the processor is a CPU, the processor implements a function by reading and executing a computer program stored in a storage circuit. On the other hand, for example, if the processor is an ASIC, instead of storing a computer program in a storage circuit, the function is directly incorporated into the circuit of the processor as a logic circuit. The processor of the embodiment is not limited to being configured as a single circuit, but may also be configured as a single processor by combining a plurality of independent circuits to implement the function.

Moreover, the computer program to be executed by the processing circuit may be stored in a single memory. Alternatively, a plurality of memories may be arranged in a distributed manner, and a corresponding computer program may be read from an individual memory. Furthermore, instead of storing a computer program in the memory, the computer program may be directly incorporated into the circuit of the processor. In this case, the processor implements the function by reading and executing the computer program incorporated in the circuit.

Each component of each apparatus according to the embodiments described above is functionally conceptual, and does not necessarily need to be physically configured as illustrated. That is, the specific mode of distribution and integration of each apparatus is not limited to that illustrated in the drawings, and all or a part thereof can be functionally or physically distributed or integrated in an optional unit, depending on various types of load and the status of use. Furthermore, all or any part of processing functions performed by each apparatus may be implemented by a CPU and a computer program analyzed and executed by the CPU, or may be implemented as hardware using wired logic.

Moreover, the methods described in the above embodiments may be implemented by executing a computer program prepared in advance on a computer such as a personal computer or a workstation. This computer program may be distributed via a network such as the Internet. Moreover, this computer program may be recorded on a non-transitory computer-readable recording medium such as a hard disk, a flexible disk (FD), a CD-ROM, an MO, and a DVD, and executed by being read from the recording medium by the computer.

According to at least one of the embodiments described above, it is possible to allow the target liquid to flow efficiently through the flow path.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus comprising:
- a member comprising a flow path in the member;
- a projection disposed on a first surface of an inner wall of the flow path, wherein said projection comprises an inclined surface disposed such that a distance from the inclined surface to a second surface of the inner wall positioned on a side opposite to the first surface of the inner wall increases towards a downstream side of the member in a flowing direction of a target liquid; and
- a transducer element configured to cause the projection to vibrate in an intersecting direction that intersects the flowing direction.

2. The apparatus according to claim 1, wherein the projection has a shape in which a sectional shape of the projection on a plane that is orthogonal to the first surface and that is parallel to the flowing direction is a right triangle, and a hypotenuse of the right triangle corresponds to the inclined surface.

3. The apparatus according to claim 1, wherein
- the projection is a polyhedron, and
- the polyhedron has a first inclined surface disposed such that a distance from the second surface decreases toward the downstream side in the flowing direction, and a second inclined surface disposed such that a distance from the second surface increases toward the downstream side in the flowing direction, the first inclined surface being smaller than the second inclined surface.

4. The apparatus according to claim 1, comprising a plurality of the projections, wherein the projections each have a width smaller than a width of the flow path, and are disposed in a straight line along the flowing direction.

5. The apparatus according to claim 1, comprising a plurality of the projections, wherein the projections each have a width smaller than a width of the flow path, and are disposed at different positions in a direction parallel to the first surface and orthogonal to the flowing direction.

6. The apparatus according to claim 1, wherein the transducer element is an exciter configured to cause the projection to vibrate in the intersecting direction by coming into contact with an outer wall of the member.

7. The apparatus according to claim 1, wherein the member includes a first member and a second member capable of moving in the intersecting direction relative to the first member, the projection is disposed on the second member, and the transducer element configured to cause the projection to vibrate in the intersecting direction, by moving a position of the second member relative to the first member in the intersecting direction.

8. The apparatus according to claim 1, wherein the member includes a first member and a deformable second member, the projection is disposed on the second member, and the transducer element configured to cause the projection to vibrate in the intersecting direction, by using a connection part between the first member and the second member as a fixed end, and using the second member as a bowstring.

9. The apparatus according to claim 1, wherein the member has a hole, the projection is disposed in the hole in a movable manner in the intersecting direction, and the transducer element configured to cause the projection to vibrate in the intersecting direction, by moving a position of the projection in the hole in the intersecting direction.

10. The apparatus according to claim 1, wherein the target liquid is bonding material.

11. A method comprising allowing a projection disposed on a first surface of an inner wall of a flow path, wherein said projection comprises an inclined surface disposed such that a distance from a second surface of the inner wall positioned on a side opposite to the first surface of the inner wall increases towards a downstream side of a member in a flowing direction of a target liquid, to vibrate in an intersecting direction that intersects the flowing direction.

12. The method according to claim 11, wherein the projection has a shape in which a sectional shape of the projection on a plane that is orthogonal to the first surface and that is parallel to the flowing direction is a right triangle, and a hypotenuse of the right triangle corresponds to the inclined surface.

13. The method according to claim 11, wherein the projection is a polyhedron, and the polyhedron has a first inclined surface disposed such that a distance from the second surface decreases toward the downstream side in the flowing direction, and a second inclined surface disposed such that a distance from the second surface increases toward the downstream side in the flowing direction, the first inclined surface being smaller than the second inclined surface.

14. The method according to claim 11, comprising a plurality of the projections, wherein the projections each have a width smaller than a width of the flow path, and are disposed in a straight line along the flowing direction.

15. The method according to claim 11, comprising a plurality of the projections, wherein the projections each have a width smaller than a width of the flow path, and are disposed at different positions in a direction parallel to the first surface and orthogonal to the flowing direction.

16. The method according to claim 11, wherein a transducer element is an exciter that causes the projection to vibrate in the intersecting direction by coming into contact with an outer wall of the member.

17. The method according to claim 11, wherein the member includes a first member and a second member capable of moving in the intersecting direction relative to the first member, the projection is disposed on the second member, and the transducer element causes the projection to vibrate in the intersecting direction, by moving a position of the second member relative to the first member in the intersecting direction.

18. The method according to claim 11, wherein the member includes a first member and a deformable second member, the projection is disposed on the second member, and the transducer element causes the projection to vibrate in the intersecting direction, by using a connection part between the first member and the second member as a fixed end, and using the second member as a bowstring.

19. The method according to claim 11, wherein the member has a hole, the projection is disposed in the hole in a movable manner in the intersecting direction, and the transducer element causes the projection to vibrate in the intersecting direction, by moving a position of the projection in the hole in the intersecting direction.

20. The method according to claim 11, wherein the target liquid is bonding material.

* * * * *